United States Patent
Tseng et al.

[11] Patent Number: 5,876,159
[45] Date of Patent: Mar. 2, 1999

[54] SPROCKET TRIMMING METHOD FOR THE MULTI-STAGE SPROCKET ASSEMBLY

[75] Inventors: Ching-Huan Tseng, Hsinchu; Chwan-Cherng Wang, Taipei; Chung-Biau Tsay, Hsinchu; Chung-Ping Chiang, Taipei; Pai-Hsiang Hsu, Tainan, all of Taiwan

[73] Assignee: Industrial Technology Research Institute, Hsinchu, Taiwan

[21] Appl. No.: 839,018

[22] Filed: Apr. 23, 1997

[51] Int. Cl.[6] .................................................... B23F 5/20
[52] U.S. Cl. .............................. 409/51; 409/8; 409/131; 451/47; 474/152; 474/160
[58] Field of Search .............................. 451/47, 219, 253, 451/147; 474/152, 153, 154, 156, 157, 155, 160; 409/8, 131, 132, 51

[56] References Cited

U.S. PATENT DOCUMENTS

| | | | |
|---|---|---|---|
| 3,796,106 | 3/1974 | Fisher et al. | 74/243 R |
| 3,875,846 | 4/1975 | Stockl | 90/1.4 |
| 3,968,995 | 7/1976 | Arentzen | 299/76 |
| 4,392,841 | 7/1983 | Juy | 474/156 |
| 4,610,576 | 9/1986 | Erhardt | 407/21 |
| 5,188,569 | 2/1993 | Kobayashi | 474/160 |
| 5,437,582 | 8/1995 | Romano | 474/156 |
| 5,545,096 | 8/1996 | Su | 474/160 |

*Primary Examiner*—Daniel W. Howell
*Assistant Examiner*—Adesh Bhargava
*Attorney, Agent, or Firm*—W. Wayne Liauh

[57] ABSTRACT

A sprocket trimming method for a multi-stage sprocket assembly is disclosed which includes the steps of: (1) aligning the two sprockets at a gear shift position where a chain is escaping from one sprocket and engaging with another sprocket and is being tilted at a tilting angle; (2) using a computer aided design simulation to simulate how the gear shift operation is taking place and thus identify the portion of the sprocket tooth that will be overlapped and/or interfered with the chain when the chain is moved from an escaping sprocket tooth to an engaging sprocket tooth; and (3) trimming the overlapping and interference portion of the sprocket teeth to a depth according to the following equation:

$$D = \frac{w}{2} + Lc \times \sin\theta - \left(\frac{Ts}{2} + Sg\right)$$

wherein: D is the depth of the overlapping and interference portion of the sprocket teeth to be trimmed, w is the pitch width of the chain, Lc is the pitch length of the chain, θ is the tilting angle of the chain at gear shift position, Ts is the thickness of the sprocket of a smaller diameter, Sg is the distance between the two sprockets. The trimming allows the gear shift operation to be performed without the chain interfering with the sprocket teeth located between the escaping and engaging teeth.

1 Claim, 6 Drawing Sheets

SPROCKET TRIMMING METHOD FOR THE MULTI-STAGE SPROCKET ASSEMBLY

BACKGROUND OF THE INVENTION

This invention relates to a sprocket trimming method for a multi-stage sprocket assembly in a bicycle, and particularly to sprocket trimming method applicable for the structure disclosed in the U.S. Pat. No. 5,409,422 issued on Apr. 25, 1995 to the assignee.

In order to improve the efficiency and effectiveness of the gear shifting process for a multi-speed bicycle, U.S. Pat, No. 5,409,422 taught two sprocket tooth trimming methods and structure for the multi-stage sprocket assembly in a bicycle.

However the specifics about how the sprocket teeth should best be chamfered and trimmed laterally have not been fully elaborated.

SUMMARY OF THE INVENTION

It is therefore an object of this invention to provide a sprocket trimming method which includes specific procedures for chamfering the sprocket teeth so that the resultant multis-tage sprocket operation can be performed smoothly and quietly without the noisy and rough change that usually happens with a conventional multi-speed bicycle.

The method of this invention mainly uses the Computer Aided Design(CAD) as a tool to simulate the profile and position relationship between the sprocket teeth and the chain during gear shifting operations. The overlap and interference between the sprocket teeth and the chain can be calculated and determined precisely through a computer simulation process. The exact profile of the sprocket teeth and the portion should be optionally chamfered can be accurately figured out in advance. Therefore, the molds and machining process to be used can be established precisely for producing the sprockets needed

BRIEF DESCRIPTION OF THE DRAWINGS

The present invention, as well as its many advantages, may be further understood by the following detailed description and drawings in which.

DETAILED DESCRIPTION OF THE PREFERRED EMBODIMENT

Figure 1:
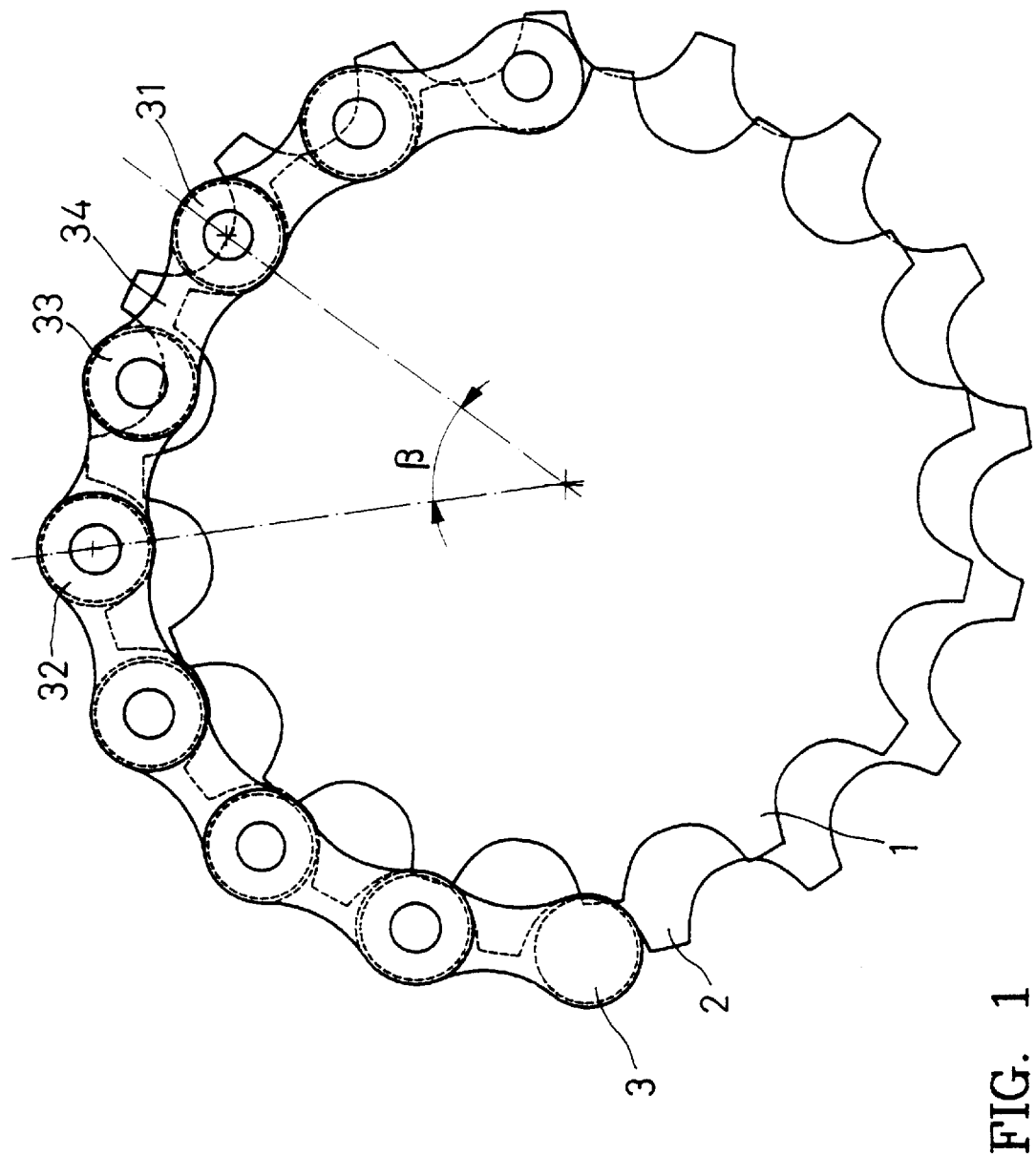
FIG. 1 is a fragmentary side view of a two-sprocket assembly for a conventional multi-stage freewheel in a bicycle.
Figure 2:
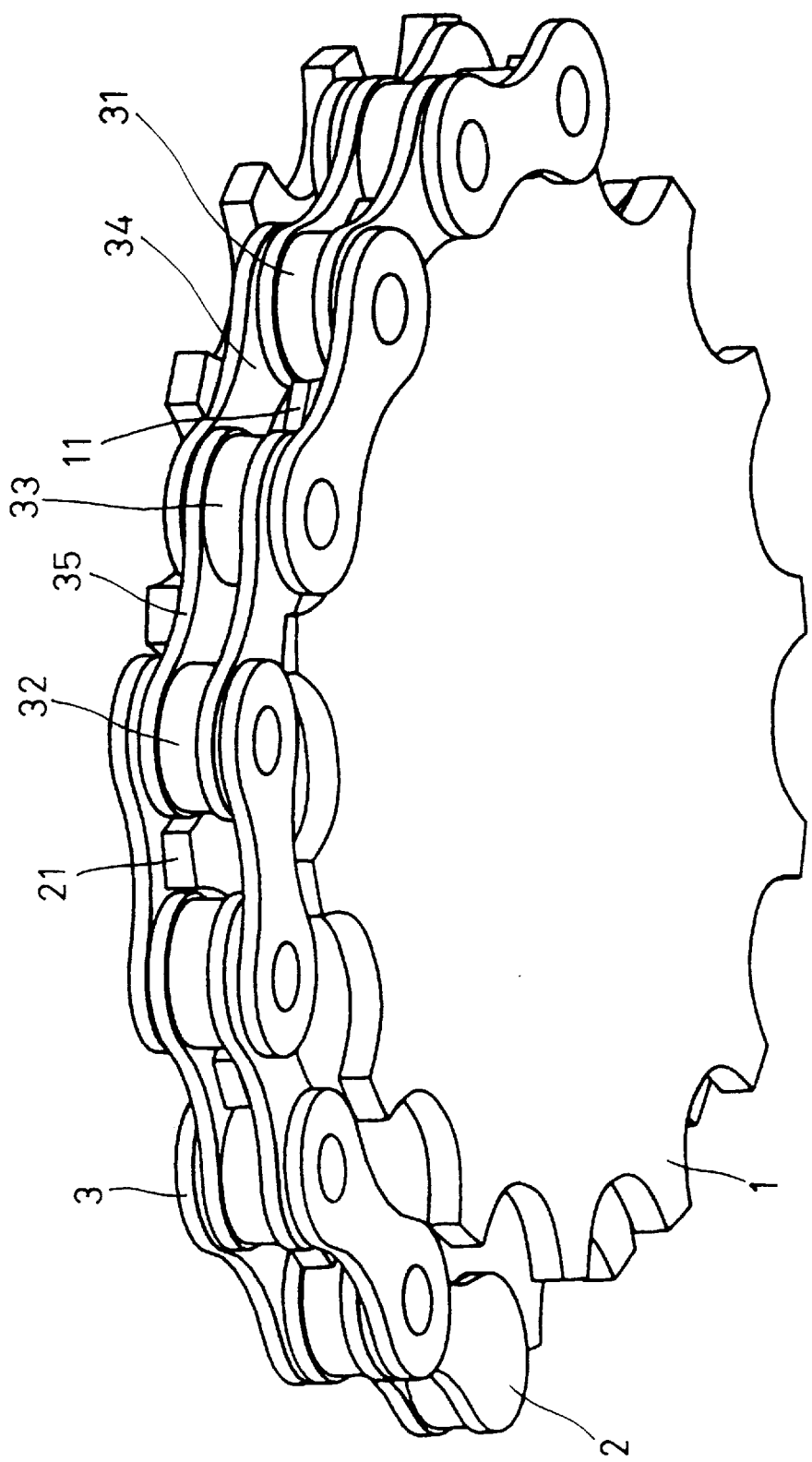
FIG. 2 is a fragmentary perspective view of a two-sprocket assembly shown in FIG. 1.

Referring to FIGS. 1 and 2, a conventional multi-stage freewheel for bicycle usually includes at least a small sprocket 1, a large sprocket 2 and a chain 3 engageable with the sprocket 1 or 2. The chain 3 in general includes a plural number of rollers 31, 32, 33 connected in pairs by a pair of outer link plates 34 and a pair of inner link plates 35. A pitch of the chain 3, such as one between the rollers 31 and 33, or 33 and 32, engages with a small sprocket tooth 11 or a large sprocket tooth 21.

For gear-shifting to be done successfully, e,g, moving the chain 3 from the small sprocket 1 to the large sprocket 2, both sprockets 1 and 2 should be moved and positioned with each other at a selected phase angle B. Then the chain 3 can be moved from the escaping roller 31 on the small sprocket 1 to the engaging roller 32 on the large sprocket 2. As the chain 3 is twisted and stretched slantly between the small sproket 1 and the large sprocket 2 during gear shifting (shown in FIG. 4), the outer link plate 34 between the escaping roller 31 and the engaging roller 32 will hit and interfere with a large sprocket tooth located therebetween (shown in FIG. 4 with a legend I1) The interference could also happen between the inner link plate 35 and the small sprocket tooth (shown by I2 in FIG. 4) during the gear-shifting operation. Both of these happenings will produce noise and cause the gear-shifting operations to become rough. It is an annoying problem without effective solution as yet. This invention contemplates to offer a method to solve this problem.

Figure 3:
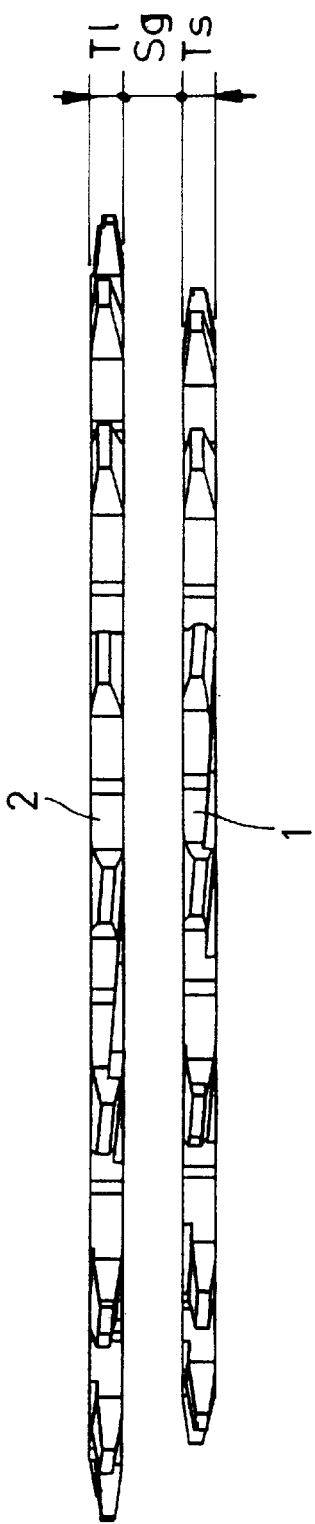
FIG. 3 is a top view of two sprockets of this invention.

Referring to FIG. 3 for a two sprockets assembly, the small sprocket 1 has thickness $T_s$, the large sprocket 2 has thickness $T_1$ and the distance between them is Sg.

Figure 4:
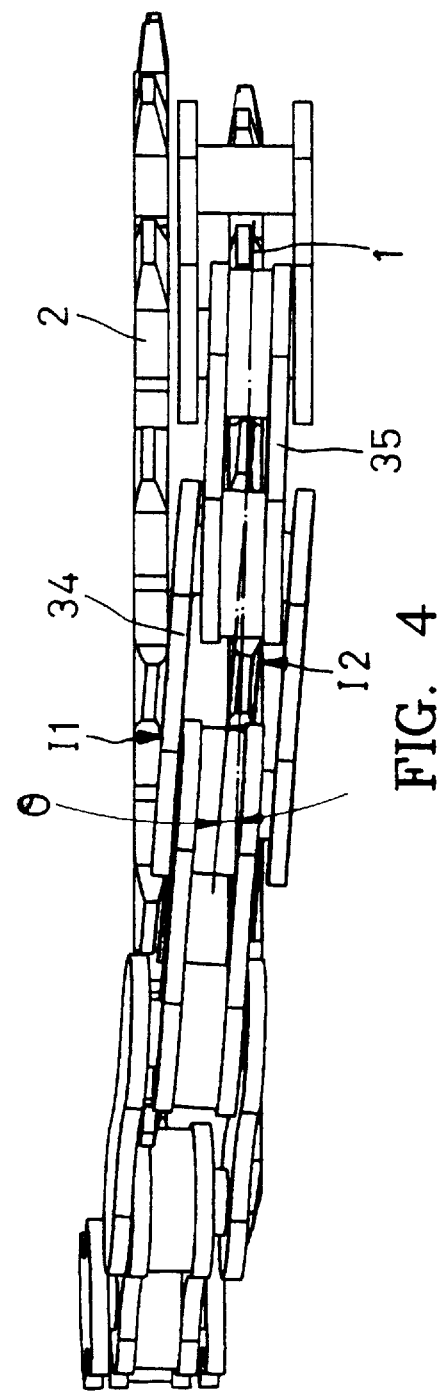
FIG. 4 is a fragmentary top view of two sprockets and a chain at gear-shifting stage.
Figure 5:
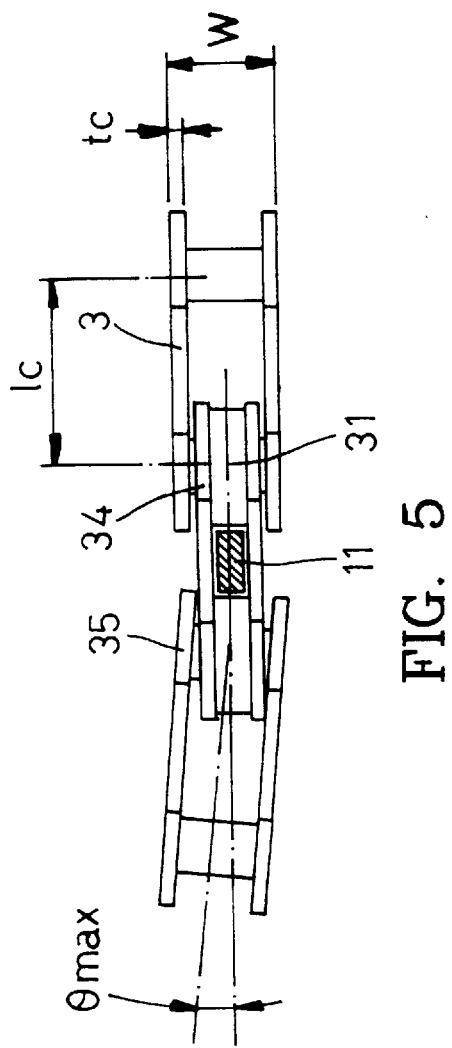
FIG. 5 is a fragmentary top view of a chain at gear-shifting stage

Referring to FIG. 5, a pitch of the chain 3 has pitch length Lc, link plate thickness tc and pitch width w. Because of a tolerance existing between the outer link plate 35 and inner link plate 34, the link plate of a pitch plate may be moved and tilted sidewardly to a maximum angle θmax. When gear-shift taking place, the chain 3 will be moved sidewardly at an angle θ which is usually between o and θmax as shown in FIG. 4.

Figure 6:
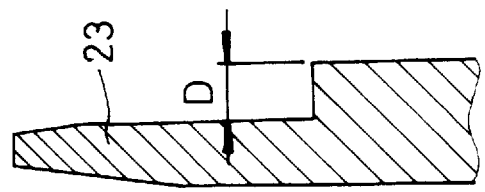
FIG. 6 is a fragmentary sectional view of a sprocket tooth.

Referring to FIG. 6, by means of CAD simulation and calculation, the lateral depth D of a tooth 23 to be chamfered and trimmed so that the interference between the chain 3 and the large sprocket 2 can be avoided during gear-shift operation can be determined as follow:

$$D = \frac{w}{2} + L_c \times \sin\theta - \left(\frac{T_s}{2} + S_g\right)$$

Figure 7:
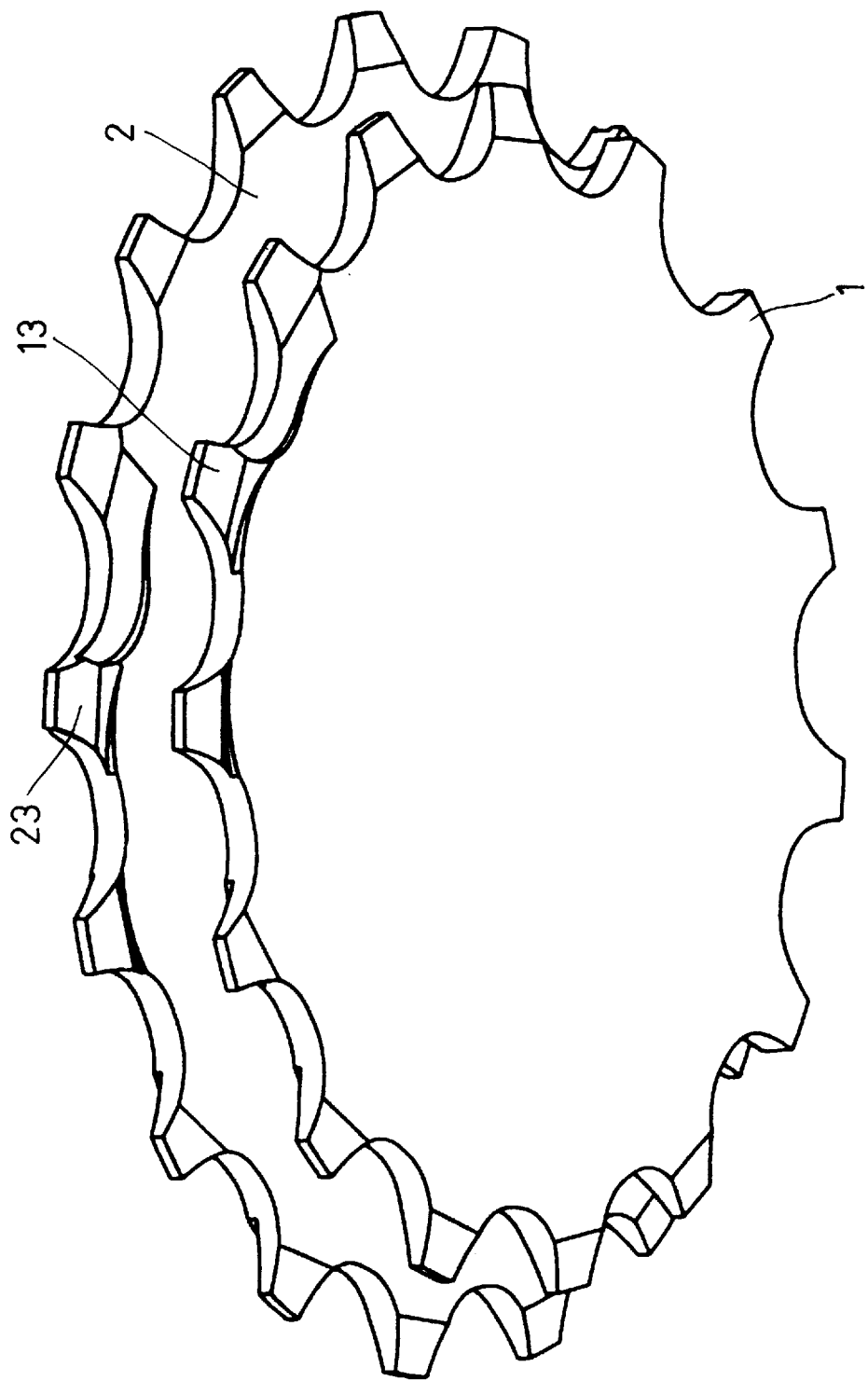
FIG. 7 is a prospective view of two sprockets being trimmed according to this invention

FIG. 7 illustrates tooth 23 of the large sprocket 2 has been trimmed according to the method set forth above. A CAD simulation simulates how the gear-shift operation is taking place at a certain phase angular position of a sprocket assembly, only those teeth that are shown with interference in the simulation will be trimmed. Same method may be applied to a tooth 13 on a small sprocket 1 for the same purpose.

Figure 8:
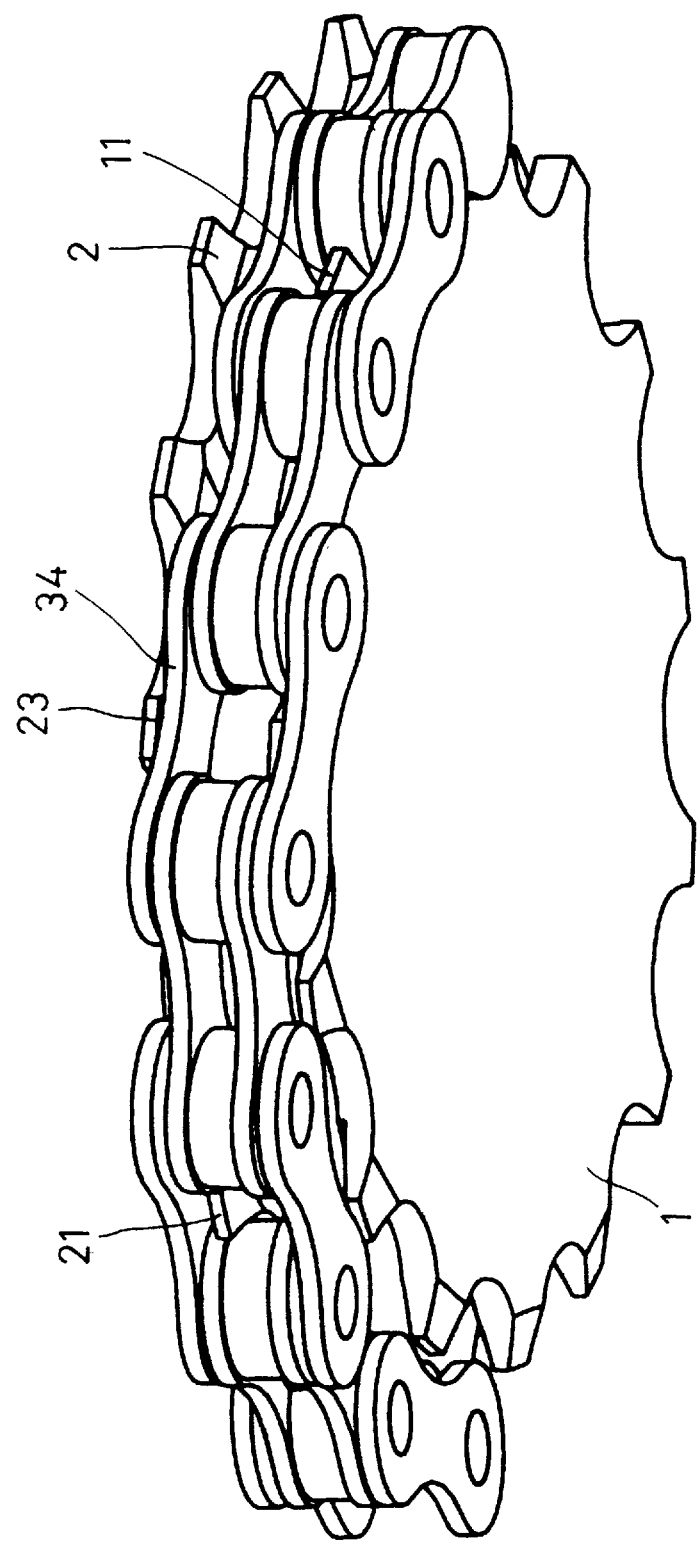
FIG. 8 is a fragmentary perspeative view of a sprocket assembly according to this invention.

FIG. 8 illustrates a sprocket assembly after being trimmed according to this invention. A tooth 23 between the escaping tooth 11 and the engaging tooth 21 was chamfered and trimmed according to this invention. The outer link plate 34 can be moved smoothly without hitting the tooth 23.

Therefore gear-shift operation can be made smoothly and quietly without noise or jumping as conventional sprocket assembly does.

We claim:

1. A sprocket trimming method for a multi-stage sprocket assembly with at least two spaced sprockets of different diameters in a bicycle, each sprocket having a plurality of sprocket teeth, and said method comprising the following steps:

aligning the two sprockets at a gear shift position where a chain is escaping from one sprocket and engaging with another sprocket and is being tilted at a tilting angle;

using a computer aided design simulation to simulate how the gear shift operation is taking place at said tilting angle and thus identify an overlapping and interference portion of each sprocket tooth relative to the chain when the chain is moved from an escaping sprocket tooth to an engaging sprocket tooth; and trimming the overlapping and interference portion of the sprocket teeth to a depth according to the following equation:

$$D = \frac{w}{2} + Lc \times \sin\theta - \left(\frac{Ts}{2} + Sg\right)$$

wherein:
D is the depth of the overlapping and interference portion of the sprocket teeth to be trimmed,
w is the pitch width of the chain,
Lc is the pitch length of the chain,
$\theta$ is the tilting angle of the chain at gear shift position,
Ts is the thickness of the sprocket of a smaller diameter,
Sg is the distance between the two sprockets;

whereby said trimming allows the gear shift operation to be performed without the chain interfering with the sprocket teeth located between the escaping and engaging teeth.

* * * * *